(12) United States Patent
Seigneur et al.

(10) Patent No.: US 12,348,186 B2
(45) Date of Patent: Jul. 1, 2025

(54) SYSTEMS AND METHODS TO PERFORM ELECTROLUMINESCENCE AND PHOTOLUMINESCENCE CHARACTERIZATION IN THE FIELD ON PHOTOVOLTAIC MODULES, STRINGS, AND ARRAYS

(71) Applicant: University of Central Florida Research Foundation, Inc., Orlando, FL (US)

(72) Inventors: Hubert Seigneur, Orlando, FL (US); Ryan Smith, Austin, TX (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 119 days.

(21) Appl. No.: 18/504,459

(22) Filed: Nov. 8, 2023

(65) Prior Publication Data
US 2024/0235475 A1    Jul. 11, 2024

Related U.S. Application Data (60) Provisional application No. 63/438,125, filed on Jan. 10, 2023.

(51) Int. Cl.
*H04N 7/18* (2006.01)
*G06T 7/00* (2017.01)
(Continued)

(52) U.S. Cl.
CPC ............ *H02S 50/15* (2014.12); *G06T 7/0002* (2013.01); *H04N 23/20* (2023.01);
(Continued)

(58) Field of Classification Search
CPC .......... H04N 23/30; H04N 7/18; H02S 50/15; G06T 7/0002; G06T 2207/10048;
(Continued)

(56) References Cited

U.S. PATENT DOCUMENTS

| 4,590,327 | A  | * | 5/1986 | Nath ..................... H10F 77/215 136/258 |
| 7,742,164 | B1 | * | 6/2010 | Phillips .............. G01N 21/6452 356/243.2 |

(Continued)

OTHER PUBLICATIONS

Raghavi Bhoopathy et al.; Outdoor photoluminescence imaging of solar panels by contact less switching: Technical considerations and applications; DOI:10.1002/pip.3216; wileyonlinelibrary.com/journal/pip; pp. 217-228 Wiley 2019.
(Continued)

*Primary Examiner* — Trang U Tran
(74) *Attorney, Agent, or Firm* — Fleit Intellectual Property Law; Paul D. Bianco (57) ABSTRACT

Photoluminescence and electroluminescence are essential characterization techniques for photovoltaics cells and modules. For electroluminescence, the main technical challenge is easily injecting current into the photovoltaic to cause luminescence. The technique described herein enables daylight electroluminescence imaging without the need for external power sources. For photoluminescence, characterization is performed on photovoltaic cells, modules, strings, and arrays in daylight and without temporary mounting of LED modulators. Instead, the modulation is performed using a permanent electronic module installed within the electric circuit on the DC side. This enables automation or triggering of modulation on demand, 100% inspection without changes in hardware configuration because the cells are never shaded and provides a path to high throughput imaging.

20 Claims, 9 Drawing Sheets

(51) Int. Cl.
*H02S 50/15* (2014.01)
*H04N 23/20* (2023.01)

(52) U.S. Cl.
CPC .............. *G06T 2207/10048* (2013.01); *G06T 2207/10144* (2013.01); *G06T 2207/20216* (2013.01); *G06T 2207/20224* (2013.01)

(58) Field of Classification Search
CPC . G06T 2207/10144; G06T 2207/20216; G06T 2207/20224
USPC .......................................................... 348/125
See application file for complete search history.

(56) References Cited

U.S. PATENT DOCUMENTS

| | | | | |
|---|---|---|---|---|
| 8,330,948 B2* | 12/2012 | Gomi | ................. | G01N 21/6489 356/237.1 |
| 8,791,703 B2* | 7/2014 | Scott | ...................... | H02S 50/10 324/452 |
| 9,685,906 B2* | 6/2017 | Lagowski | ............... | H02S 50/15 |
| 9,885,662 B2* | 2/2018 | Trupke | ............... | G01N 21/6489 |
| 10,199,985 B2 | 2/2019 | Zimmermann et al. | | |
| 11,237,110 B2 | 2/2022 | Varache | | |
| 11,894,805 B2* | 2/2024 | Kraft | ......................... | H02J 1/08 |
| 2011/0084646 A1* | 4/2011 | Lisi | .......................... | H02J 7/35 320/101 |
| 2011/0255772 A1* | 10/2011 | Zimmermann | ........ | G01N 21/66 382/145 |

OTHER PUBLICATIONS

Steve Johnston et al.; Photoluminescence and Electroluminescence Outdoor Module Imaging; National Renewable Energy Laboratory; https://www.nrel.gov/docs/fy15osti/64438.pdf—2015.

Germain Rey et al.; Progress in Photovoltaics—Luminescence imaging of solar modules in full sunlight using ultranarrow bandpass filters; https://doi.org/10.1002/pip.3563; pp. 7; Wiley 2022.

Oliver Kunz et al.; High Throughput Outdoor Photoluminescence Imaging via PV String Modulation; https://ieeexplore.ieee.org/document/9519109—2021.

Mobile Test Systems—for the PV-Industry—MBJ Solutions—pp. 6; https://www.mbj-solutions.com/en/products/mobile-equipment.

Mobile Solar Module Testing Vans Have Higher Uncertainty of Measurement; hops://insights.tuv.com/blog/mobile-solar-module-testing-vans-have-hig; TUV Rheinland 2018.

Daytime Electroluminescence imaging in a darkened vanor elsewhere; mobELspot On-site daytime EL testing—BrightSpot Automation; pp. 3—https://brightspotautomation.com/products/mobelspot/ 2023.

Solarzentrum Products; Inovative, patented measurement technology for the optical inspection of solar cceellllss andmodules via electroluminescece (EL) and photoluminescence (PL)= https://www.solarzentrum-stuttgart.com/en/products/2023.

Gisele A. dos Reis Benatto et al.; Outdoor Electroluminescence Acquisition Using a Movable Testbed; https://ieeexplore.ieee.org/document/8547628—2018.

Matthias Diehl; Electroluminescence Tests to Ensure the Quality of Photovoltaic Systems—pvBuero—https://photovoltaikbuero.de/en/pv-know-how-blog-en/electroluminescence-tests-to-ensure-the-quality-of-photovoltaic-systems/ 2022.

Pilar Sanchez Molina, New electroluminescence tech for daily solar module inspections, Modules & Upstream Manufacturing Technology and R&D Spain, Sep. 28, 2022 (6 pages).

Ryan M. Smith et al, Simulated Impact of Shortened Strings in Commercial and Utility Scale Photovoltaic Arrays; Energies, Oct. 19, 2023 (16 pages).

Ryan M. Smith et al, Mismatch Losses in Simulated Commercial and Utility-Scale PV Arrays due to Shortened Strings, 2022 (1 page) (abstract only).

\* cited by examiner

SYSTEMS AND METHODS TO PERFORM ELECTROLUMINESCENCE AND PHOTOLUMINESCENCE CHARACTERIZATION IN THE FIELD ON PHOTOVOLTAIC MODULES, STRINGS, AND ARRAYS

STATEMENT REGARDING FEDERALLY SPONSORED RESEARCH OR DEVELOPMENT

This invention was made with Government support under DOE Award #DE-EE0008157, awarded by the Department of Energy. The Government has certain rights in the invention.

FIELD OF THE DISCLOSURE

The disclosure relates to systems and methods to perform electroluminescence and photoluminescence characterization in the field on photovoltaic modules, strings, and arrays in day light and without the use of an external energy source.

BACKGROUND

Electroluminescence (EL)

Electroluminescence is an essential characterization technique for photovoltaics cells and modules, primarily used in the laboratory. Recently, due to the valuable nature of this technique for failure root cause diagnostics, various research teams and companies have developed hardware to perform this technique in the field in the dark to extract the luminescence signal. The main technical challenge is easily injecting current into the photovoltaic device to cause luminescence. Existing state-of-the-art approaches for outdoor electroluminescence measurements involve using either 1) mobile solar module testing vans [5-8] or 2) movable testbed consisting of large power supply and a camera mounted on a drone [9-10].

Both approaches suffer from limitations. 1) This daytime approach is labor intensive, expensive, as it requires a crew to operate, which involves removing modules one at the time from the ground mounted structures, measure them in climate control environment within the van, and then reinstall back onto the racking system. Furthermore, mobile solar module testing vans have higher uncertainty of measurement. And the van may require high levels of maintenance. 2) This approach relies on taking aerial images of modules and strings at night, which requires connecting a large power supply with a network of switches. This approach is also labor intensive, expensive, as it requires a crew to operate, connect and disconnect a high voltage power supply. This technique is considerably slow and demands a significant amount of manpower. Because it is mostly operated at nighttime, it is subjected to hazards that come with working in the dark.

Thus, there exists a need for an improved method to perform effortless, high-throughput electroluminescence characterization in the field on photovoltaic modules, strings, and arrays without the use of module testing vans or an external bulky energy source.

Photoluminescence (PL)

Even though photoluminescence has limitations, it is still an essential characterization technique for photovoltaics cells, substrings, and modules, primarily used in the laboratory. One such limitation is that photoluminescence does not capture resistive effects because of the different mechanism involved for carrier injection, which is fully optical. Thus, unlike an electroluminescence image, a photoluminescence image will not show the wide dark areas typical in severely cracked cells. To see cracks in a photoluminescence image, the actual crack width (tens of microns in size) would need to be resolved. This requires taking a close-up image of single cells with a very high number of pixels. This approach is likely not applicable to high throughput nor wide area imaging (e.g. string or subarray-level imaging) for the purpose of assessing the quality of the installation during the photovoltaic plant commissioning or the condition of cells after a severe storm.

Nevertheless, due to the valuable nature of this technique for failure root cause diagnostics, various research teams and companies have recently developed hardware to perform photoluminescence in the field using sunlight as the sole illumination source. The main technical challenge is separating the weak luminescence signal from the much stronger ambient sunlight signal. Existing state-of-the-art approaches for outdoor photoluminescence measurements involve using either 1) the modulation of the cells' bias between the normal operating point or short circuit (SC) condition and open circuit (OC) condition [1-2] or 2) extremely narrow optical filtering [3].

Both of these approaches have drawbacks. First, the modulation of the cells' bias requires hardware, namely a light modulator in the form of, most commonly, LED lights, to be temporarily mounted onto the photovoltaic module under test. One modulator is capable of measuring one sub-string at the time. Because the modulator covers at least once cell, two measurements are needed at a minimum to image an entire substring. Each time, in between measurement, that single modulator has to be moved physically to cover a different cell. Furthermore, because a typical module has multiple substrings, so the minimum number of measurements needed to image an entire module would amount to the number of substrings times two. And the amount of measurements needed to image an entire string would be the amount of measurements needed for one photovoltaic module times the number of modules forming the string. A more recent variation of this implementation utilizes a larger modulator to cover an entire row of cells such as the modulator is traversing all sub-strings simultaneously [4]. This enables imaging all substrings at once with the exception of the cells that are covered, requiring therefore moving the larger modulator over a different row of cells for another measurement before being able to successfully image the entire photovoltaic module. Consequently, at least two separate images of the same module are required for 100% inspection of the module, causing the process to be manually intensive. Other hardware is required, such as the controller unit consisting of the illumination source driver and a personal computer. As a result, this approach is not high-throughput and is labor intensive, which is costly.

Second, extremely narrow optical filtering requires a customized telecentric camera lens system and a high precision filter more adapted for a laboratory environment instead of the rugged conditions in the field. The lens tube must be temperature-controlled so that the filter remains within the desired operating temperature range. Furthermore, the filter must be designed for a specific location and measurements performed at a specific day and time to capture the desired spectrum with the desired barometric conditions. Additionally, the technique requires nontrivial, technology-dependent calibration and significant post-measurement image correction.

Thus, there exists a need for an improved method to perform effortless, cheap, high-throughput photoluminescence characterization in the field on photovoltaic cells, sub-strings, modules, strings, subarrays, and arrays in day light and without the use of an external energy source.

SUMMARY OF THE DISCLOSURE

One aspect of the disclosure relates to a method for determining damage to a photovoltaic cell, sub-string, module, string, or subarray in a photovoltaic array using electroluminescence. The method comprises: using a device connected to a current generating photovoltaic cell, sub-string, module, string, subarray, or array, with the device electrically, magnetically, or otherwise connected to the current generating photovoltaic cell, substring, module, string, subarray, or array to increase the voltage of the current generating photovoltaic cell, substring, module, string, subarray, or array with respect to a current sinking photovoltaic cell, substring, module, string, subarray, or array; taking an equivalent voltage condition image of the current sinking photovoltaic cell, sub-string, module, string, subarray, or array with an imaging apparatus while connected to the current generating photovoltaic cell, substring, module, string, subarray, or array; modifying the photovoltaic cell, sub-string, module, string, subarray, or array configuration to push current from one or more current sourcing cell, sub-string, module, string, subarray, or array into one or more current sinking cell, sub-string, module, string, subarray, or array; taking an increased voltage condition image of the current sinking photovoltaic cell, sub-string, module, string, subarray, or array with an imaging apparatus; and subtracting one of the equivalent voltage condition image from the increased voltage condition image to determine damage to the photovoltaic cell, substring, module, string, subarray, or array. The electroluminescence is performable in day light without an external energy source.

In an exemplary embodiment, modifying string voltage comprises shortening one or more strings by one or more modules so that the one or more shortened strings consume current generated by unshortened strings in the array. In another exemplary embodiment, modifying string voltage comprises lengthening one or more strings by one or more modules so that the one or more lengthened strings force current into unlengthened strings in the array. In yet another exemplary embodiment, modifying string voltage comprises using a DC to DC converter to boost voltage of one or more current sourcing strings to allow current to flow to one or more current sinking strings.

The equivalent voltage image is taken before the modified voltage image. Alternatively, the modified voltage image is taken before the equivalent voltage image.

In exemplary embodiments, the method further comprises modulating current during at least one of the equivalent voltage image and the modified voltage image. In some embodiments, a band pass filter and/or a cut-off filter is used on the imaging apparatus to limit photons hitting an imaging detector of the imaging apparatus to improve the signal to noise ratio.

Either one or both of the equivalent voltage condition image and the modified voltage condition image comprises a single exposure image. Alternatively, either one or both of the equivalent voltage condition image comprises an averaged image from multiple exposure images.

Another aspect of the disclosure relates to a method for determining damage to a photovoltaic cell, substring, module, string, or subarray, in a photovoltaic array using photoluminescence. The method comprises: using an electronic module connected to the photovoltaic module, string, sub-array, or array to change an operating point of the photovoltaic cell, substring, module, string, subarray, or array from an operating point to a near short circuit condition, with the electronic module electrically, magnetically, optically or otherwise connected to the photovoltaic cell, substring, module, string, subarray, or array; taking a near short circuit condition image of the photovoltaic cell, substring, module, string, subarray, or array with an imaging apparatus; using the electronic module to change the operating point of the photovoltaic cell, substring, module, string, subarray, or array to a near open circuit condition; taking a near open circuit condition image of the photovoltaic cell, substring, module, string, subarray, or array with the imaging apparatus; and subtracting one of the near short circuit condition image and the near open circuit condition image from the other of the near short circuit condition image and the near open circuit condition image to determine damage to the photovoltaic cell, sub-string, module, string, subarray, or array. The photoluminescence is performable in day light without an external energy source and the electronic module can remain connected to the photovoltaic module, string, subarray, or array.

The near open circuit image is taken before the near short circuit image. Alternatively, the short circuit image is taken before the near open circuit image.

In exemplary embodiments, the method further comprises modulating current in preparation to image at least one of the near open circuit image or near short circuit image.

A regular bandpass filter about the emission wavelength of silicon can be used on the imaging apparatus to improve the signal to noise ratio.

In exemplary embodiments, at least one of the near short circuit condition image and the near open circuit condition comprises a single exposure image. In other exemplary embodiments, at least one of the near short circuit condition image and the near open circuit condition comprises an averaged image from multiple exposure images.

The disclosure also relates to a system for determining damage to a photovoltaic cell, sub-string, module, string, or subarray in a photovoltaic array using electroluminescence. The system comprises: a device connected to a current generating photovoltaic cell, substring, module, string, subarray, or array, the device electrically, magnetically, or otherwise connected to the current generating photovoltaic cell, substring, module, string, subarray, or array to increase the voltage of the current generating photovoltaic cell, substring, module, string, subarray, or array with respect to a current sinking photovoltaic cell, substring, module, string, subarray, or array; a device for modifying the photovoltaic cell, sub-string, module, string, subarray, or array configuration to push current from one or more current sourcing cell, sub-string, module, string, subarray, or array into one or more current sinking cell, sub-string, module, string, subarray, or array; an imaging apparatus for taking an equivalent voltage condition image of the current sinking photovoltaic cell, sub-string, module, string, subarray, or array and for taking an increased voltage condition image of the current sinking photovoltaic cell, sub-string, module, string, subarray, or array with an imaging apparatus; and an image processor for subtracting one of the equivalent voltage condition image from the increased voltage condition image to determine damage to the photovoltaic cell, substring, module, string, subarray, or array. The electroluminescence is performable in day light without an external energy source.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein.

DETAILED DESCRIPTION

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. As used herein, the singular forms "a", "an" and "the" are intended to include the plural forms as well, unless the context clearly indicates otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

Electroluminescence

In general, one aspect of the disclosure relates to systems and methods for electroluminescence which involve using electronic devices within the electrical circuit capable of rerouting current generated from one photovoltaic device into another photovoltaic device, where the photovoltaic device can be a cell, a substring, a module, a string, a subarray, an array, a plant, etc, for the purpose of injecting current and producing a luminescence signal. Although the examples below use an inverter as the electronic device, the disclosure contemplates the electronic devices could take the form of or be incorporated in: micro-inverters (module-level inverters); electronic loads using semiconductor devices to change the PV component operating point; or controllable switching elements (electromechanical or semiconductor) which "short" the PV component (module, string, array).

Figure 1:
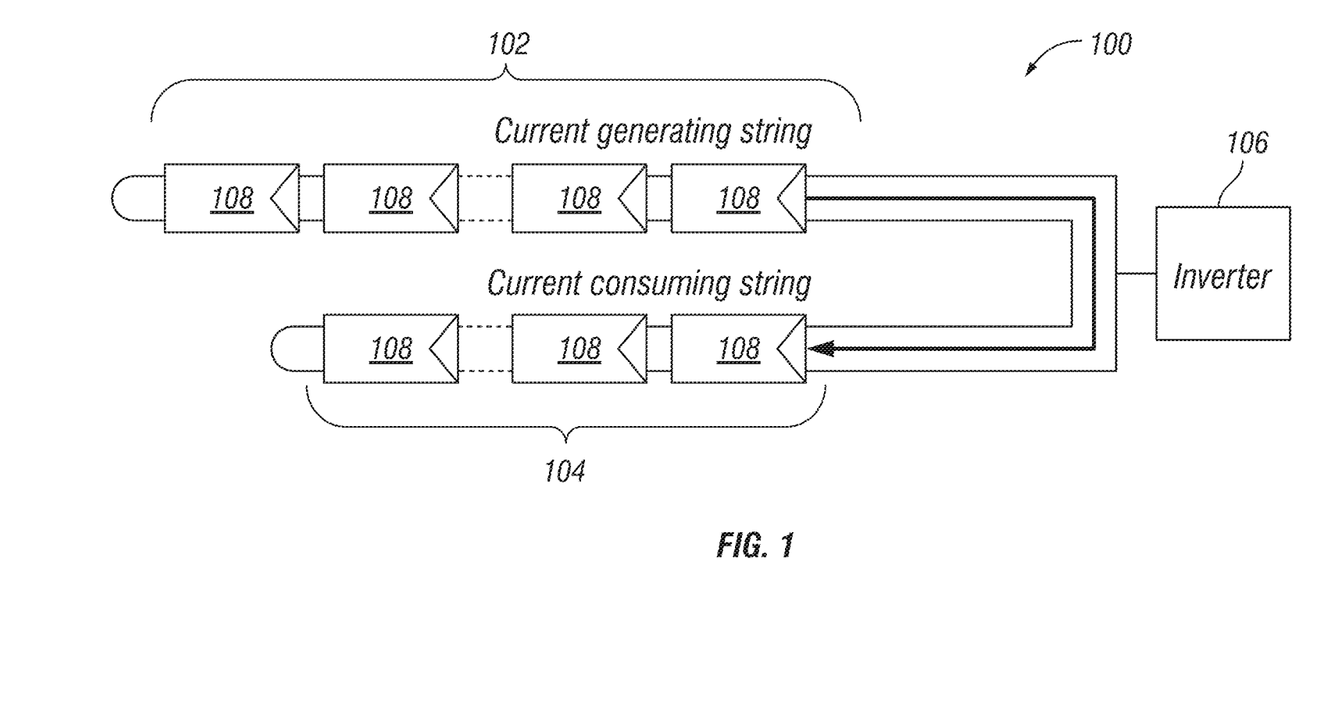
FIG. 1 schematically shows the generation of current loops.

FIG. 1 schematically shows a subarray or array 100 that includes a first string 102 and a second string 104 that are connected in parallel to an inverter 106. It is noted again, even though the photovoltaic devices shown are first and second strings 102, 104, the disclosure contemplates that the photovoltaic devices can be cells, substrings, modules, subarrays, arrays, plants, etc. First string 102 comprises two or more cells 108 and second string 104 comprises one or more cells 108. With inverter 106 off or at open circuit, current can flow from first string 102 to second string 104 since second string 104 is shorter (due to removal or damage of at least one cell 108) in length than first string 102, thus generating current loops. The current generated in first string 102 is being sunk into second string 104.

Figure 2:
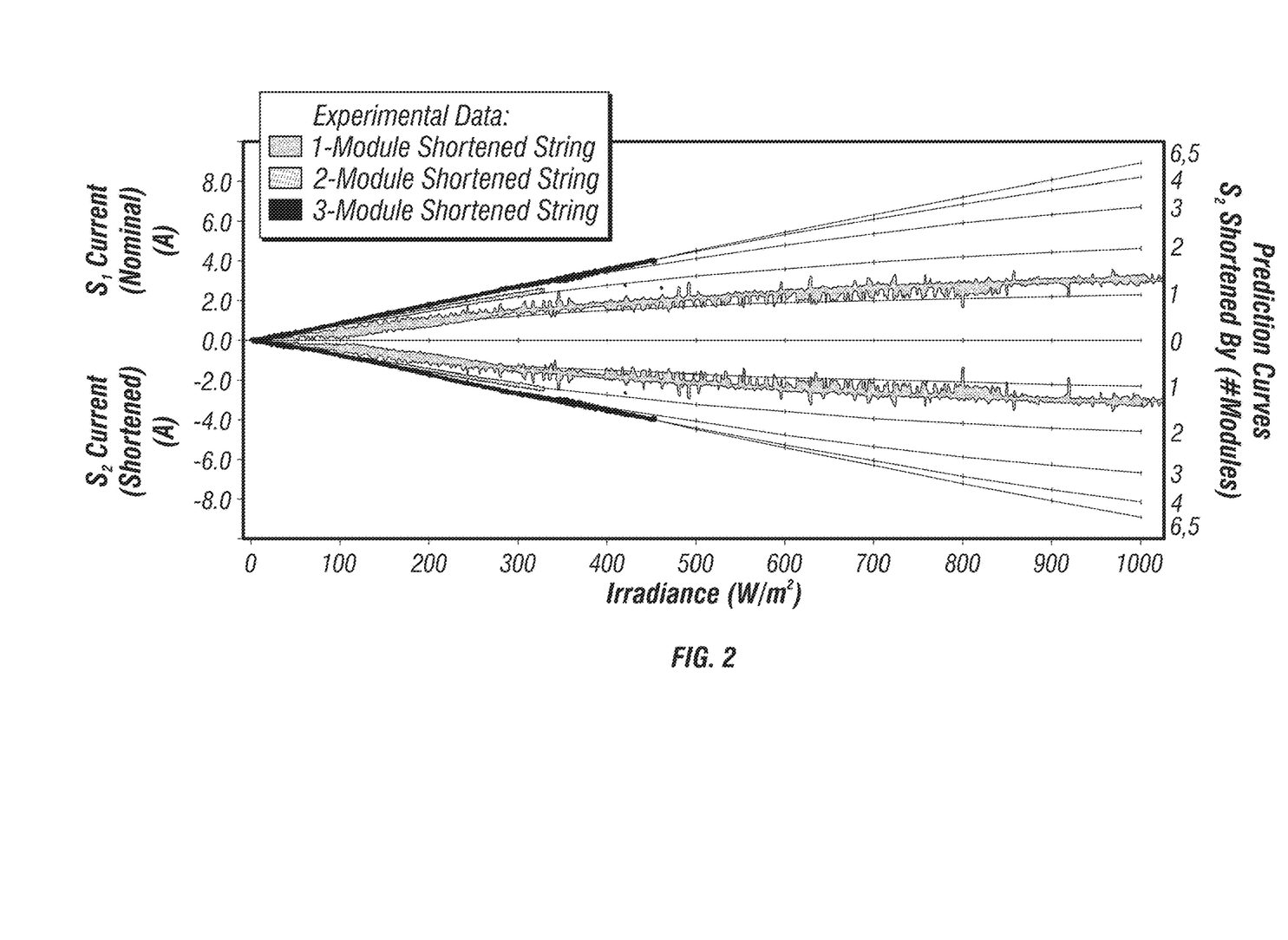
FIG. 2 compares simulation and experimental data of the generation of current loops with a two string array.

FIG. 2 shows simulation and experimental data of a two-string array analogous to that shown in FIG. 1. The curves indicate simulation predictions. The points indicate measured circulating current with 1-module shortened, 2-module shortened, and 3-module shortened condition. The sinking of the current is due to the shortened strings operating at a lower voltage with respect to regular strings. This also happens in solar plants due a practice known as jumping, where a broken panel is removed without being replaced or "jumped" by connecting the two neighboring panels that are in good condition. Although simple in concept, manual shortening of strings for EL imaging purposes is not desirable nor practical. In the field, it is also not practical to connect an external heavy bulky power supply to induce current flow.

Figure 3:
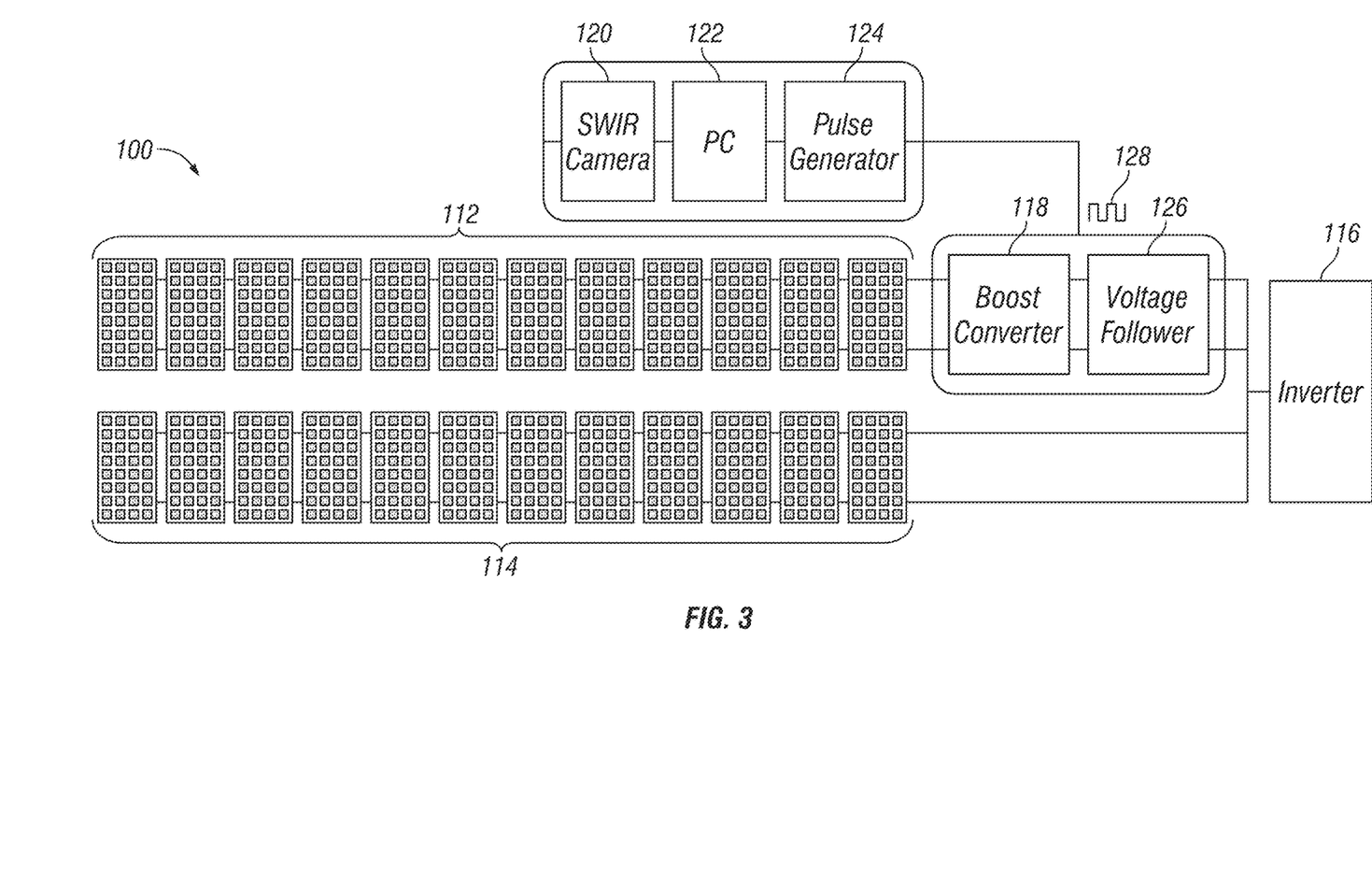
FIG. 3 shows one embodiment of a hardware diagram according to the disclosure for EL imaging.

FIG. 3 shows one embodiment of hardware that can be used to boost the voltage of one string with respect to another on demand using a power electronics circuit inside a smart combiner in order to inject the needed current for EL imaging. Specifically, a first string 112 and a second string 114 are connected in parallel to an inverter 116 within a subarray 100. When a computer 122 generates a control signal 128 using the pulse generator 124, the first string 114 voltage is boosted with the electronics 118 and 126 and current generated by the first string 114 is injected into the second string 114 while the inverter 116 is turned off or disconnected or at open circuit condition, and the second string 114 can sink current from first string 112, thus generating current loops. Current generated from first string 112 (the source string) is injected into second string 114 (the measurement string).

A boost converter 118 attached to first string 112 increases the voltage of first string 112 to the point where a sufficient reverse current flows into second string 114 to generate luminescence of second string 114 for EL imaging. In addition to switching inverter 116 from the maximum power point tracking operation to near open circuit or fully disconnected condition to minimize the current sent to the grid and maximize current for the measurement, modification of the voltage from first string 112 with boost converter 118 pushes current from the current sourcing string (first string 112) into the current sinking string (second string 114) for electroluminescence imaging.

Exemplary lock-in imaging capabilities as shown include an IR camera 120 and a controller (a computer 122 and a pulse generator 124). In addition to boost converter 118, the hardware to inject current into second string 114, the string under test, includes a voltage follower 126 to prevent the signal source from being affected by currents that the load may impose and allow for oscillation of the bias. Oscillation of the bias (schematically represented by reference numeral 128) establishes oscillation of the luminescence signal and enables the use of lock-in imaging techniques. Although FIG. 3 shows the controller (computer 122 and pulse generator 124) as external, the controller can be integrated with boost converter 118 and voltage follower 126) and communicate wirelessly with IR camera 120, which is free to move about to take images. This is discussed below with reference to FIGS. 6 and 7.

EL measurement is performed while inverter 116 is turned off or at open circuit, which allows current from first string 112 (the sourcing string) to be directed to second string 114 (the sinking string) for electroluminescence imaging. The source string is routed through voltage boost converter 118 to provide a sufficient voltage bias offset between strings 112, 114 to establish current flow and generate luminescence in second string 114, the string under test. To extract a good signal in daytime, a high signal to noise ratio is desired; this may be achieved by lock-in imaging and modulation of the voltage bias, hence injected current, during the measurement. A control signal from the controller (computer 122 and pulse generator 124) synchronizes the camera shutter of IR camera 120 with the signal of boost converter 118; synchronization is needed for lock-in imaging so that both luminescing and non-luminescing frames are captured.

Specifically, when inverter 116 is in an open circuit condition (e.g. turned off) a first image is taken with an imaging apparatus (such as, for example, infrared camera 120) to capture the luminescence signal. Then one or more strings (such as second string 114) are shortened by one or more modules, based on the configuration of the array and desired current injection levels, and another image is taken. This is followed by subtracting the two images (pixel by pixel) to eliminate the contribution from the sun reflections and photoluminescence signal and retain only the contribution of the electroluminescence signal. To extract a good signal in daytime, a high signal to noise ratio is desired, and may be achieved by lock-in imaging and modulation of the current during the measurement by dynamically controlling the length of the string(s) with smart switches. Additionally, band pass and/or cut-off filters on the imaging apparatus limit the unwanted photons hitting the imaging detector.

Figure 4A:
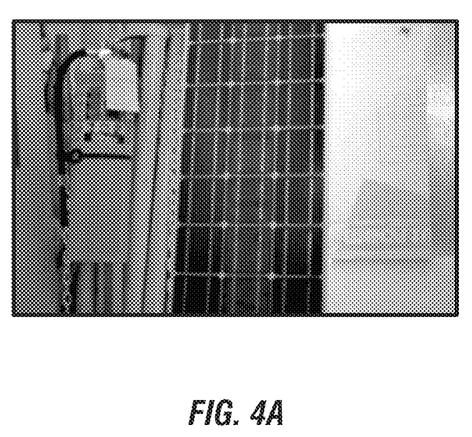
FIGS. 4A and 4B show luminescing images of a tested module, with some daylight in the background (FIG. 4A) and no daylight in the background (FIG. 4B).
Figure 4B:
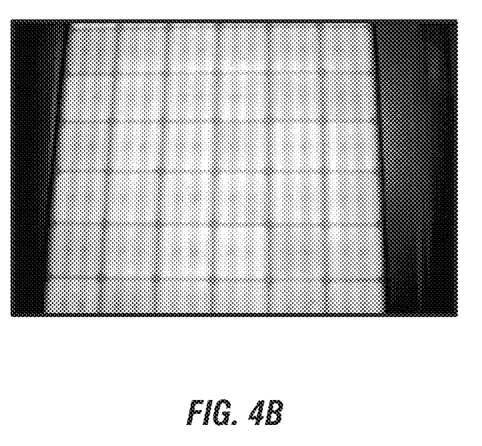

FIG. 4A shows a luminescing image with some daylight in the background and FIG. 4B shows a luminescing image without daylight in the background for a test setup analogous to that shown in FIG. 3. In this test, a 72-cell module (high voltage) and a 36-cell module (low voltage) were initially connected in parallel using only the built-in voltage difference between these to inject current, and no external power supply was used. When both modules were placed outside in day light, the EL signal was not detectable in the 36-cell module due to the overwhelming influence of sunlight drowning the EL signal and the lack of lock-in imaging technique to reduce the signal to noise ratio. When the 36-cell module was brought inside the lab near the door with less day light and under ambient room light while the 72-cell module remained outside in day light (FIG. 4A), an EL signal was measurable. The EL signal can be seen especially in the center column of solar cells, which show a lighter gray pattern over the cells with some areas that are darker. Similar results were obtained when replacing the 36-cell module with an identical 72-cell modules (FIG. 4.B). With the no daylight inside the lab, the 72-cell modules located outdoor (high voltage) was able inject current into the 72-cell modules located indoor (no voltage since indoor in the dark), with one outdoor behaving as the source module and the other indoor as the measurement module. The EL signal is clearly seen in the darker setting and appears as if the solar cells are glowing.

Post-processing of the captured images eliminates the contribution from the sun's reflections and retains only the contribution of the electroluminescence signal. Band pass filters and/or cut-off filters on the imaging apparatus (shown as IR camera 120 in FIG. 3) can limit unwanted wavelengths of light from impacting the imaging detector.

Figure 5:
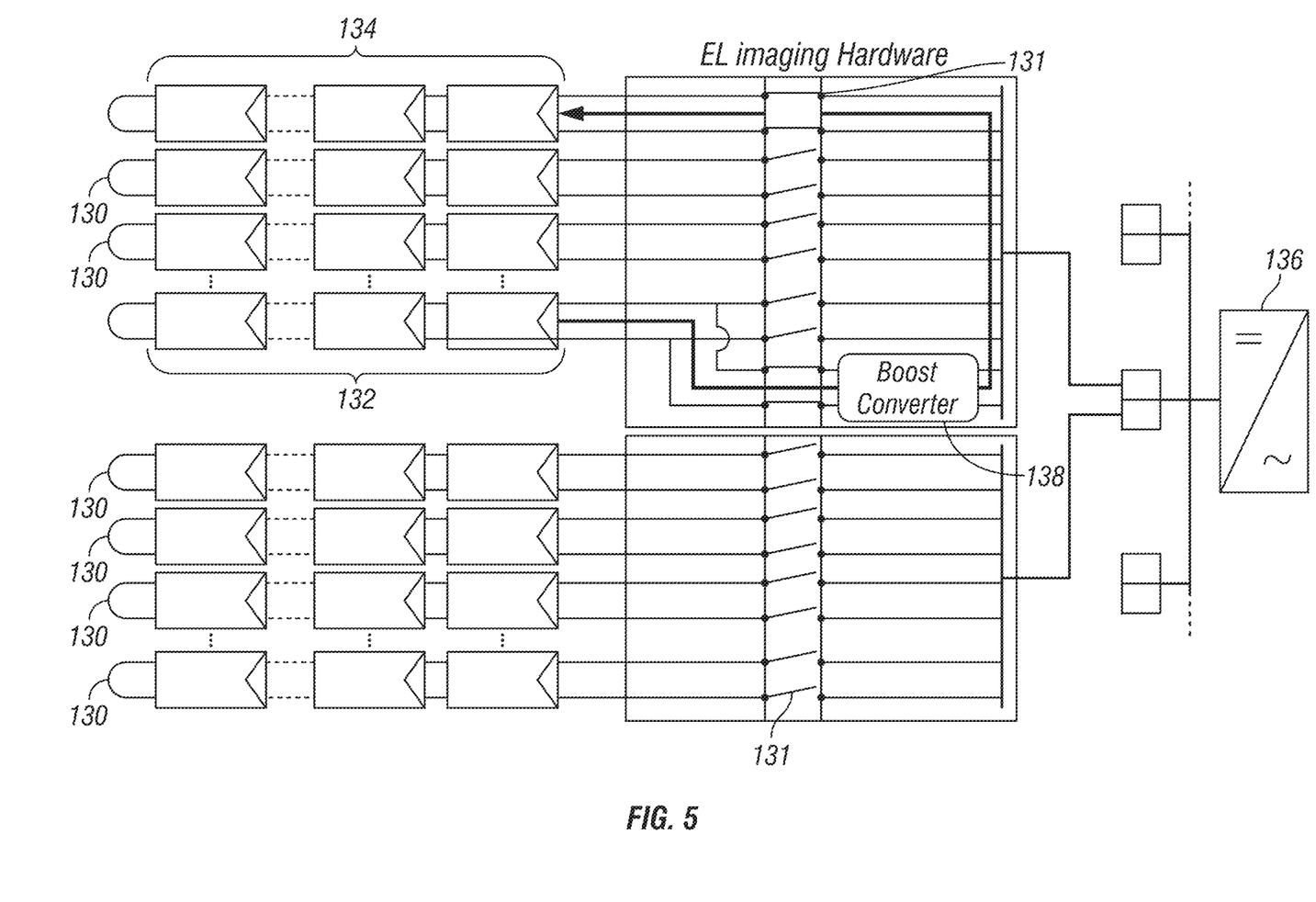
FIG. 5 shows another embodiment of a hardware diagram of the method according to the disclosure showing current path during EL imaging.

FIG. 5 illustrates an example wherein strings 130 are disconnected from the DC bus via switches 131 except for the one string to be imaged (string 134) and a separate string (string 132) which is routed through a voltage boost converter 138 with inverter 136 turned off or at open circuit to provide sufficient bias between strings 132, 134 to establish current flow and luminescence in string 134, the string to be imaged. A device to allow for oscillation of the bias, such as voltage follower 126 of FIG. 3, can also be included as oscillation of the bias establishes oscillation of the luminescence signal and enables the use of lock-in imaging techniques.

Although the previous examples utilize string shortening, in alternative embodiments, string lengthening (equivalent to increasing the voltage) would enable the lengthened string(s) to force current into other parallel string(s) at lower voltages. While the inverter is at open circuit condition, a first image is taken with an imaging apparatus (such as, for example, an infrared camera) to capture the luminescence signal. Then one or more strings are lengthened by one or more modules, based on the configuration of the array and desired current injection levels, and another image is taken. This is followed by subtracting the two images (pixel by pixel) to eliminate the contribution from the sun reflections and photoluminescence signal and retain only the contribution of the electroluminescence signal. To extract a good signal in daytime, a high signal to noise ratio is desired, and may be achieved by lock-in imaging and modulation of the current during the measurement by dynamically controlling the length of the string(s) with smart switches. Additionally, band pass and/or cut-off filters on the imaging apparatus limit the unwanted photons hitting the imaging detector.

As discussed above, string voltage manipulations can be achieved with the use of a DC-to-DC booster converter, which eliminates the need to control the length of one or more strings. The DC-to-DC converter effectively boosts the voltage of the current sourcing string(s) and therefore allows current to flow from it to current sinking string(s) under test. To extract a good signal in daytime, a high signal to noise ratio is desired, and may be achieved through lock-in imaging and the modulation of the current during the measurement. This could be done by (but not limited too) a voltage follower circuit placed after the DC-to-DC converter controlled using a square wave generator. Additionally, a band pass and/or cut-off filters on the imaging apparatus limit the unwanted photons hitting the imaging detector.

Figure 6:
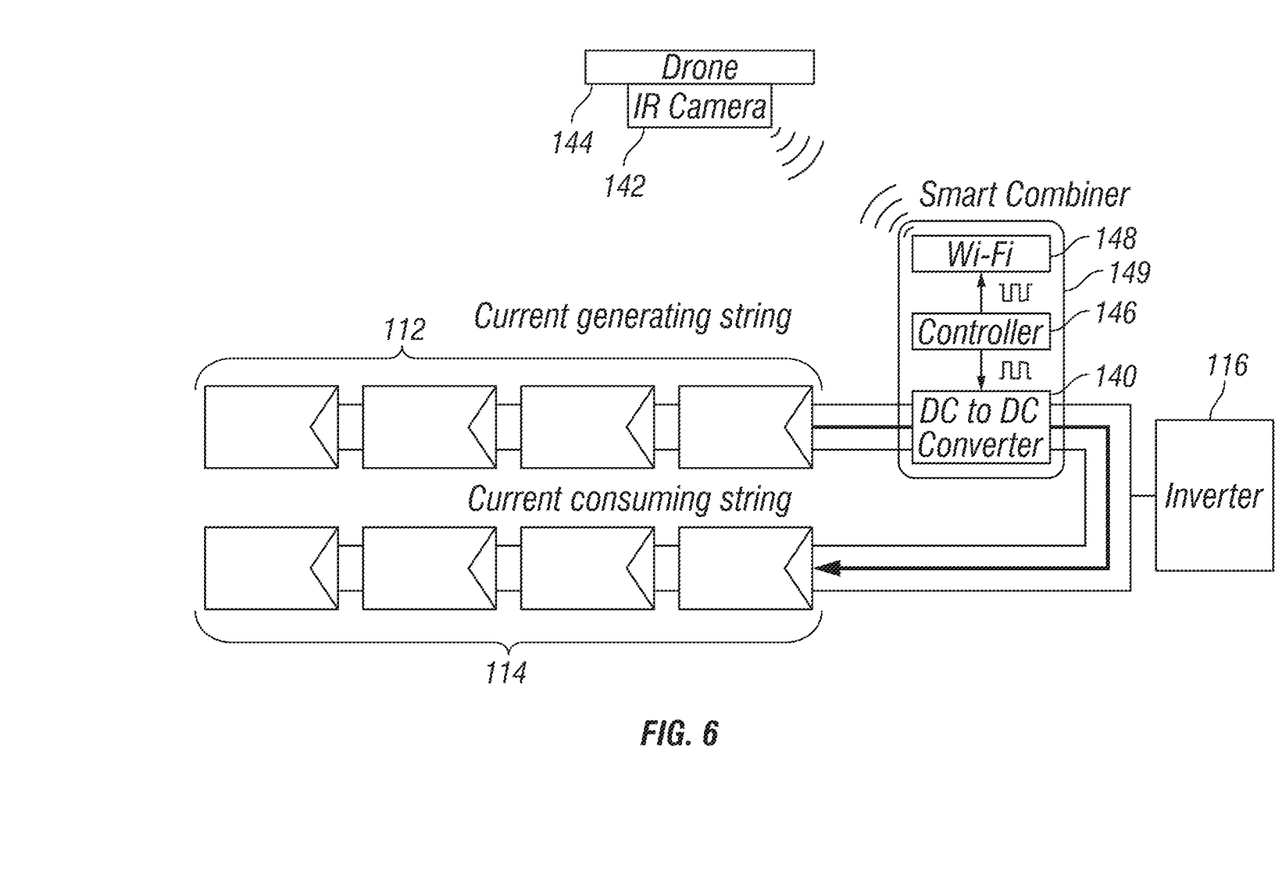
FIG. 6 shows an alternative embodiment to FIG. 3 for EL imaging.
Figure 7:
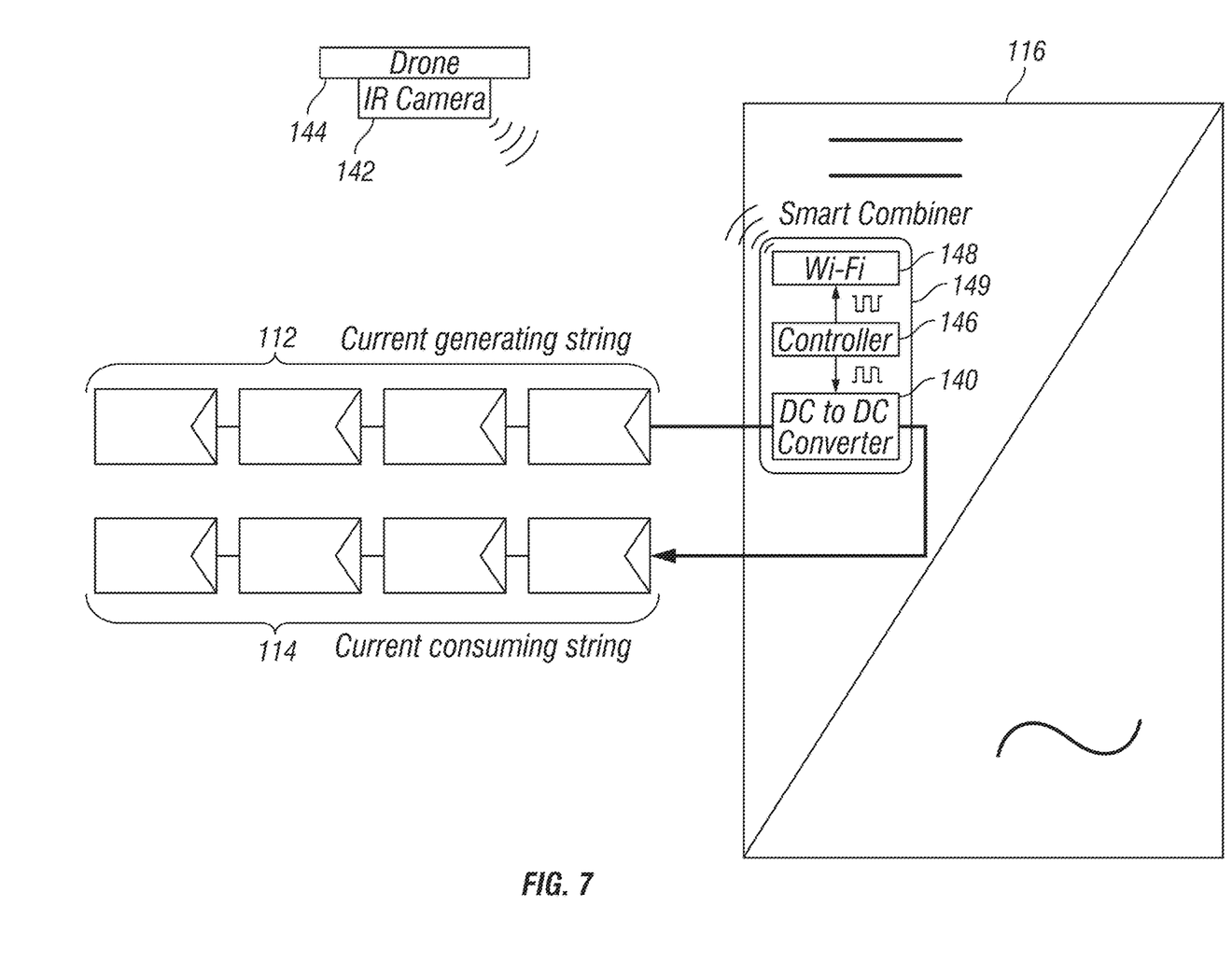
FIG. 7 shows a second embodiment to FIG. 3 for EL imaging.

FIGS. 6 and 7 show other embodiments of string voltage manipulation with the use of a DC-to-DC converter. In the figures, first string 112 and second string 114 are connected in parallel to an inverter 116. A DC-to-DC converter 140 attached to first string 112 boosts the voltage of first string 112 (the current sourcing string) and therefore allows current to flow from it to second string 114 (the current sinking string) when inverter 116 is turned off or at open circuit.

DC-to-DC converter 140 attached to first string 112 increases the voltage of first string 112 to the point where a sufficient reverse current flows into second string 114 to generate luminescence of second string 114 for EL imaging. In addition to switching inverter 116 from the maximum power point tracking operation to near open circuit or fully disconnected condition to minimize the current sent to the grid and maximize current for the measurement, modification of the voltage from first string 112 with DC-to-DC converter 140 pushes current from the current sourcing string (first string 112) into the current sinking string (second string 114) for electroluminescence imaging.

Exemplary lock-in imaging capabilities as shown include an IR camera 142, which is part of or attached to drone 144, so as to be movable and a controller 146 (which, as previously discussed includes a computer or other processor and a pulse generator). A Wi-Fi module 148 provides for wireless communication between controller 146 and IR camera. The disclosure contemplates that other wireless communication protocols can be used instead of or in addition to Wi-Fi module 148. In addition to DC-to-DC converter 140, the hardware to inject current into second string 114, the string under test, can include a voltage follower to allow for oscillation of the bias. Oscillation of the bias establishes oscillation of the luminescence signal and enables the use of lock-in imaging techniques. In FIG. 6, smart combiner 149 (converter 140, controller 146, Wi-Fi module 148, and voltage follower) are external to inverter 116, while in FIG. 7 smart combiner 149 is integral to inverter 116.

EL measurement is performed while inverter 116 is turned off, which allows current from first string 112 (the sourcing string) to be directed to second string 114 (the sinking string) for electroluminescence imaging. The source string is routed through voltage converter 140 to provide a sufficient voltage bias offset between strings 112, 114 to establish current flow and generate luminescence in second string 114, the string under test. To extract a good signal in daytime, a high signal to noise ratio is desired; this may be achieved by lock-in imaging and modulation of the voltage bias, hence injected current, during the measurement. A control signal from controller 146 synchronizes the camera shutter of IR camera 142 with the signal of converter 140; synchronization is needed for lock-in imaging so that both luminescing and non-luminescing frames are captured.

Specifically, when inverter 116 is in an open circuit condition (e.g. turned off) a first image is taken with an imaging apparatus (such as, for example, infrared camera 142) to capture the luminescence signal. Then current is injected into second string 114 from first string 112 and another image is taken. This is followed by subtracting the two images (pixel by pixel) to eliminate the contribution from the sun reflections and photoluminescence signal and retain only the contribution of the electroluminescence signal. To extract a good signal in daytime, a high signal to noise ratio is desired, and may be achieved by lock-in imaging and modulation of the current during the measurement by dynamically controlling the length of the string(s) with smart switches. Additionally, band pass and/or cut-off filters on the imaging apparatus limit the unwanted photons hitting the imaging detector.

Photoluminescence

In general, another aspect of the disclosure relates to systems and methods of performing photoluminescence characterization in the field on photovoltaic cells, substrings, modules, strings, subarrays, and arrays in day light and without the use of external illumination sources or extremely narrow optical filtering. The disclosed systems and methods for photoluminescence involves using an already installed electronic module within the electrical circuit capable of disconnecting a photovoltaic device on the DC side and setting its operating point to SC (or near short circuit) and OC (or near open circuit) for the purpose of collecting the luminescence signal, where the photovoltaic device can be a cell, a substring, a module, a string, a subarray, an array, a plant, etc. The electronic module can be integrated within but not limited to encapsulated cells, junction boxes, combiners, recombiners, inverters, or any other portion of the system on the DC side.

Figure 8:
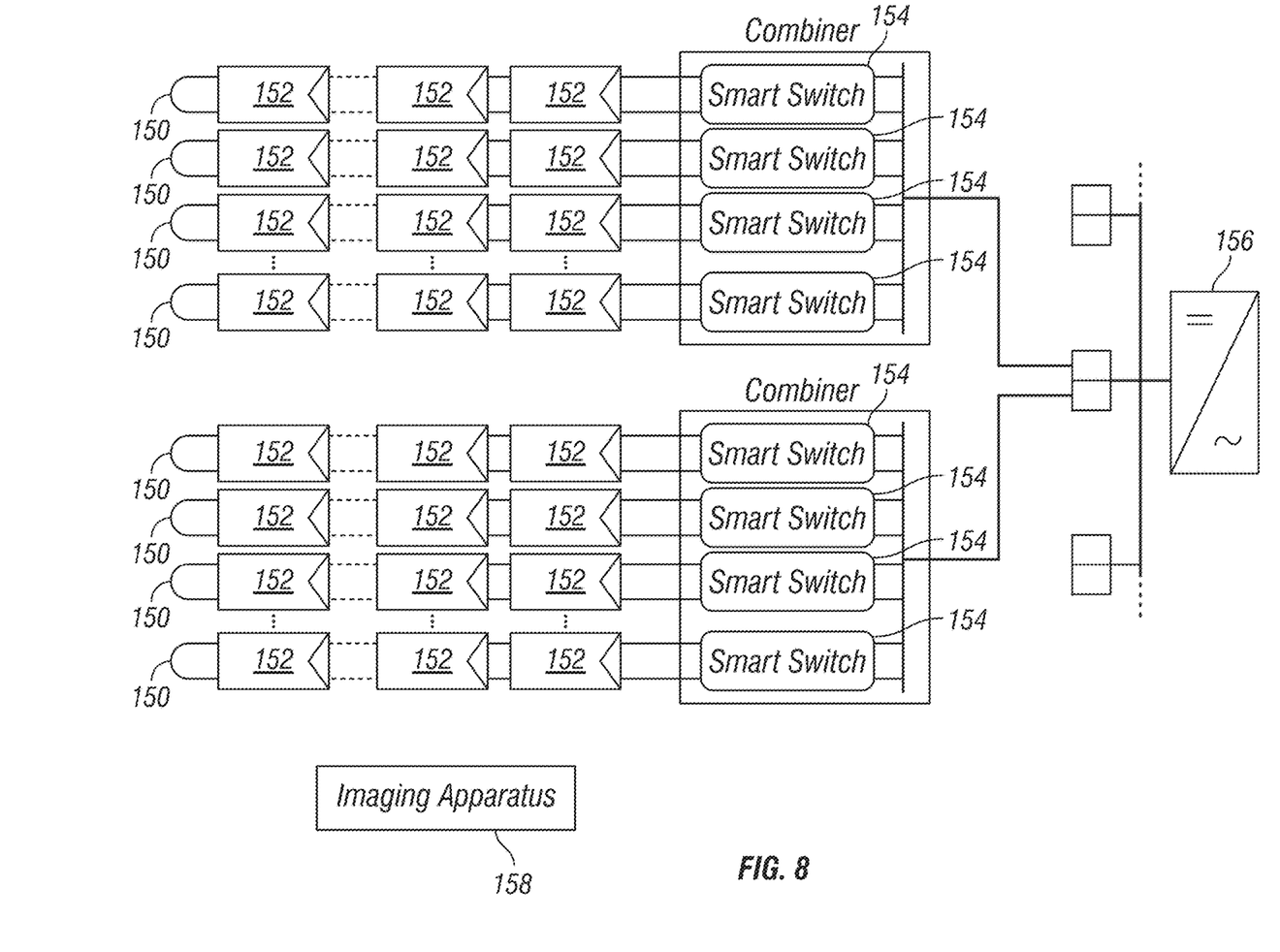
FIG. 8 shows a hardware diagram of the method according to the disclosure showing modulation of the entire string operating conditions during PL imaging using a smart switch.
Figure 9:
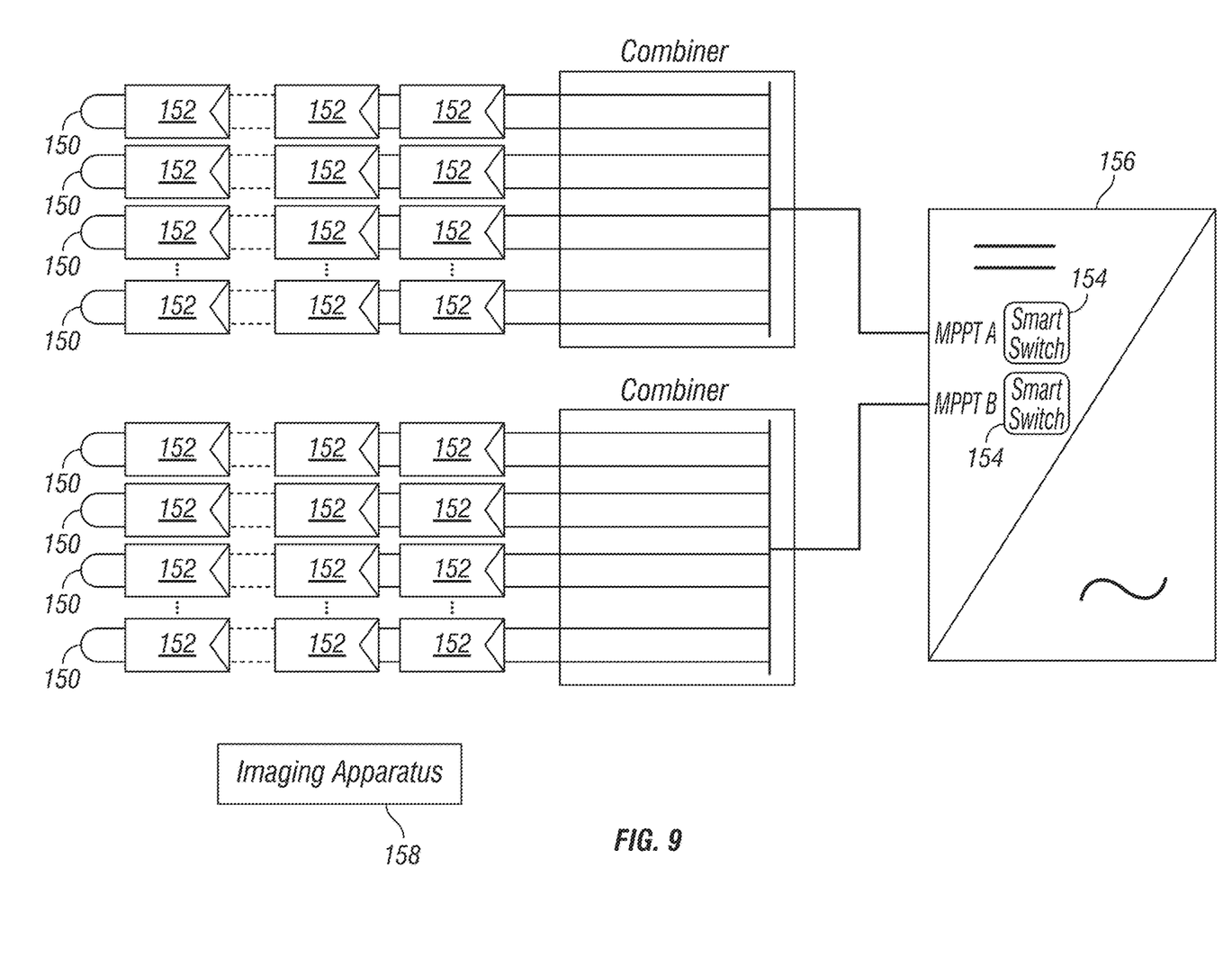
FIG. 9 shows a hardware diagram of the method according to the disclosure showing modulation of the entire string(s) operating conditions during PL imaging using a string inverter.

FIGS. 8 and 9 show non-limiting examples of implementation of the disclosed systems and methods. In both figures, strings 150, each of which comprises one or more cells 152, remain at their nominal length and connection. A switch, which is basically an electronic load, is used to switch the operating point of the string or the array. The switch can be integrated within the inverter (FIG. 9) or be standalone (FIG. 8) and the load can be changed using any suitable known method.

In FIG. 8, electronic module 154 (labeled "smart switch") can be used directly (i.e. eliminating the need to install temporary hardwire for modulation) to change the operating point of the photovoltaic cell, substring, module, string, subarray, or array during the day from the usual maximum power point tracking to first a short circuit current condition (capture an image) and then the open circuit condition (capture another image), or vice versa.

In effect, smart switch 154 is used to modulate the photovoltaic device (in this one of strings 150) operating point between two different conditions, which enables effective extraction of the weak luminescence signal from the much stronger ambient sunlight signal using lock-in imaging. In this regard, smart switch 154 can include a device to optically change the operating point such as for example, an LED modulator. Further, short circuit and open circuit conditions do not need to be 100% achieved as long as a measurable signal resulting from the difference in emission is obtainable going from the near short circuit current to the near open circuit voltage.

Alternately, FIG. 9, electronic module (labeled "smart switch") 154 may be incorporated into inverter 156. At this location, electronic module 154 enables modulation between operating points for all strings 150 attached through electronic module 154. In both cases, results are obtained by subtracting the two images (pixel by pixel) to eliminate the contribution from the sun and retain only the contribution of the solar cells. The images can be taken with any suitable imaging apparatus, such as, for example, infrared camera 158, and may be from single exposures or averaged images from multiple exposures.

At the short circuit condition, cells 152 do not emit light (or very little) since all the carriers exit the cells through the contact. At the open circuit voltage condition, cells 152 emit all the light absorbed from the sun since no carrier can escape the cell. These opposite ends of the operating spectrum generate a strong enough signal for photoluminescence imaging. To improve the signal to noise ratio, a lock-in signal is established by modulating the current during the measurement. Separately, to improve the signal to noise ratio, one can use a regular bandpass filter about the emission wavelength of silicon.

The use of such an electronic switch presents many advantages over state-of-the-art solutions, including, for example:

This approach does not require mounting and removing hardware.
This approach enables automation or triggering of modulation on demand.
This approach enables 100% inspection without changes in hardware configuration.
This approach is scalable from the cell level to potentially the array level for high throughput imaging.

REFERENCES

[1] https://doi.org/10.1002/pip.3216
[2] https://www.nrel.gov/docs/fy15osti/64438.pdf
[3] https://doi.org/10.1002/pip.3563
[4] https://ieeexplore.ieee.org/document/9519109
[5] https://www.mbj-solutions.com/en/products/mobile-equipment
[6] https://insights.tuv.com/blog/mobile-solar-module-testing-vans-have-higher-uncertainty-of-measurement
[7] https://brightspotautomation.com/products/mobel-spot/
[8] https://www.solarzentrum-stuttgart.com/en/products/
[9] https://ieeexplore.ieee.org/document/8547628
[10] https://photovoltaikbuero.de/en/pv-know-how-blog-en/electroluminescence-tests-to-ensure-the-quality-of-photovoltaic-systems/

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains.

Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended representative claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the representative claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following representative claims be interpreted to embrace all such variations and modifications.

What is claimed is:

1. A method for determining damage to a photovoltaic cell, sub-string, module, string, or subarray in a photovoltaic array using electroluminescence, the method comprising:
using a device connected to a current generating photovoltaic cell, substring, module, string, subarray, or array, the device electrically, magnetically, or otherwise connected to the current generating photovoltaic cell, substring, module, string, subarray, or array to increase the voltage of the current generating photovoltaic cell, substring, module, string, subarray, or array with respect to a current sinking photovoltaic cell, substring, module, string, subarray, or array;
taking an equivalent voltage condition image of the current sinking photovoltaic cell, sub-string, module, string, subarray, or array with an imaging apparatus while connected to the current generating photovoltaic cell, substring, module, string, subarray, or array;
modifying the photovoltaic cell, sub-string, module, string, subarray, or array configuration to push current from one or more current sourcing cell, sub-string, module, string, subarray, or array into one or more current sinking cell, sub-string, module, string, subarray, or array;

taking an increased voltage condition image of the current sinking photovoltaic cell, sub-string, module, string, subarray, or array with an imaging apparatus; and subtracting one of the equivalent voltage condition image from the increased voltage condition image to determine damage to the photovoltaic cell, substring, module, string, subarray, or array, wherein the electroluminescence is performable in day light without an external energy source.

2. The method of claim 1, wherein modifying string voltage comprises shortening one or more strings by one or more modules so that the one or more shortened strings consume current generated by unshortened strings in the array.

3. The method of claim 1, wherein modifying string voltage comprises lengthening one or more strings by one or more modules so that the one or more lengthened strings force current into unlengthened strings in the array.

4. The method of claim 1, wherein modifying string voltage comprises using a DC to DC converter to boost voltage of one or more current sourcing strings to allow current to flow to one or more current sinking strings.

5. The method of claim 1, wherein the equivalent voltage image is taken before the modified voltage image.

6. The method of claim 1, wherein the modified voltage image is taken before the equivalent voltage image.

7. The method of claim 1, further comprising modulating current during at least one of the equivalent voltage image and the modified voltage image.

8. The method of claim 7, wherein a band pass filter and/or a cut-off filter is used on the imaging apparatus to limit photons hitting an imaging detector of the imaging apparatus to improve the signal to noise ratio.

9. The method of claim 8, wherein the equivalent voltage condition image comprises a single exposure image.

10. The method of claim 8, wherein the modified voltage condition image comprises a single exposure image.

11. The method of claim 8, wherein the equivalent voltage condition image comprises an averaged image from multiple exposure images.

12. The method of claim 8, wherein the modified voltage condition image comprises an averaged image from multiple exposure images.

13. A method for determining damage to a photovoltaic cell, substring, module, string, or subarray, in a photovoltaic array using photoluminescence, the method comprising:

using an electronic module connected to the photovoltaic module, string, subarray, or array to change an operating point of the photovoltaic cell, substring, module, string, subarray, or array from an operating point to a near short circuit condition, the electronic module electrically, magnetically, optically or otherwise connected to the photovoltaic cell, substring, module, string, subarray, or array;

taking a near short circuit condition image of the photovoltaic cell, substring, module, string, subarray, or array with an imaging apparatus;

using the electronic module to change the operating point of the photovoltaic cell, substring, module, string, subarray, or array to a near open circuit condition;

taking a near open circuit condition image of the photovoltaic cell, substring, module, string, subarray, or array with the imaging apparatus; and subtracting one of the near short circuit condition image and the near open circuit condition image from the other of the near short circuit condition image and the near open circuit condition image to determine damage to the photovoltaic cell, sub-string, module, string, subarray, or array, wherein the photoluminescence is performable in day light without an external energy source and the electronic module can remain connected to the photovoltaic module, string, subarray, or array.

14. The method of claim 13, wherein the near open circuit image is taken before the near short circuit image.

15. The method of claim 13, wherein the short circuit image is taken before the near open circuit image.

16. The method of claim 13, further comprising modulating current in preparation to image at least one of the near open circuit image or near short circuit image.

17. The method of claim 13, wherein a regular bandpass filter about the emission wavelength of silicon is used on the imaging apparatus to improve the signal to noise ratio.

18. The method of claim 13, wherein at least one of the near short circuit condition image and the near open circuit condition comprises a single exposure image.

19. The method of claim 13, wherein at least one of the near short circuit condition image and the near open circuit condition comprises an averaged image from multiple exposure images.

20. A system for determining damage to a photovoltaic cell, sub-string, module, string, or subarray in a photovoltaic array using electroluminescence, the system comprising:

a device connected to a current generating photovoltaic cell, substring, module, string, subarray, or array, the device electrically, magnetically, or otherwise connected to the current generating photovoltaic cell, substring, module, string, subarray, or array to increase the voltage of the current generating photovoltaic cell, substring, module, string, subarray, or array with respect to a current sinking photovoltaic cell, substring, module, string, subarray, or array;

a device for modifying the photovoltaic cell, sub-string, module, string, subarray, or array configuration to push current from one or more current sourcing cell, substring, module, string, subarray, or array into one or more current sinking cell, sub-string, module, string, subarray, or array;

an imaging apparatus for taking an equivalent voltage condition image of the current sinking photovoltaic cell, sub-string, module, string, subarray, or array and for taking an increased voltage condition image of the current sinking photovoltaic cell, sub-string, module, string, subarray, or array with an imaging apparatus; and an image processor for subtracting one of the equivalent voltage condition image from the increased voltage condition image to determine damage to the photovoltaic cell, substring, module, string, subarray, or array, wherein the electroluminescence is performable in day light without an external energy source.

* * * * *